Patented July 3, 1934

1,965,457

UNITED STATES PATENT OFFICE 1,965,457

PROCESS OF PRODUCING CHLORATES AND PERCHLORATES

Udo Ehrhardt, Bitterfeld, Germany, assignor to I. G. Farbenindustrie Aktiengesellschaft, Frankfort-on-the-Main, Germany No Drawing. Application December 14, 1931, Serial No. 581,069. In Germany December 24, 1930

13 Claims. (Cl. 23—85)

The present invention relates to a process for producing chlorates and perchlorates particularly of magnesium and the alkaline earth metals.

In recent years, numerous uses have been found and developed for the chlorate and perchlorate compounds of magnesium and the alkaline earth metals. This, for example, calcium chlorate and magnesium chlorate, either alone or in mixture with other salts, such as chlorides, have been largely recommended as herbicides, whereas, for instance, magnesium perchlorate, either in the form of its tri-hydrate or as anhydrous salt, is being employed, either alone or in mixture with other salts, as a means for drying gases. Since in practice chlorates and perchlorates are nowadays usually produced by electrolysis, starting from sodium chloride according to known processes, the problem thus frequently arises of converting the sodium chlorate and sodium perchlorate thus obtained, into the magnesium or alkaline earth compounds of the respective halogen-oxygen acid.

The present invention is based on the observation that the ratio of solubilities of sodium chloride on the one hand, and of the chlorates and perchlorates of magnesium and the alkaline earth metals on the other, is, with rising temperatures, continuously shifted in favour of the halogen-oxygen compounds. It thus appears possible, by mutual decomposition of sodium chlorate and sodium perchlorate with a chloride of the alkaline earth metals (including magnesium), to arrive at the technically pure alkaline earth metal chlorates and perchlorates, respectively.

In the following specification, everything that is said about alkaline earth metals and alkaline earth metal compounds, unless otherwise explicitly stated, also applied equally to magnesium and the respective magnesium compounds and it is to be understood that magnesium, for the purposes of the present invention, is included in the term "alkaline earth metals," whether used in the specification or in the claims.

The conversion according to the present invention is preferably carried out by concentrating by evaporation, a solution containing sodium chlorate or sodium perchlorate as well as the respective alkaline earth metal chloride in suitable proportions, thus causing sodium chloride— this being the least soluble of the salts which might be formed from the solution—to separate in solid form, whereupon the halogen-oxygen compound of the alakline earth metal (i. e. the chlorate or the perchlorate, as the case may be) is recovered in crystallized form from the solution remaining after separation of the sodium chloride.

The filtrate of the first precipitate of sodium chloride frequently still contains unconverted sodium chlorate or sodium perchlorate in varying percentages. In order to convert also the latter into sodium chloride and to remove them from the mother liquor in this form, it is advantageous, after separation of the sodium chloride precipitated in the first step of the process, either to add further quantities of sodium chlorate or sodium perchlorate so as to increase the concentration of sodium ions in the solution, or to further concentrate the solution by evaporation. Which of these two possible courses is followed depends on the circumstances of the particular case, as will be more fully illustrated below.

When producing alkaline earth metal chlorates according to the present invention from a sodium chlorate solution it is possible to employ as a starting solution the liquor produced in the known processes of making sodium chlorate by electrolysis without removing the sodium chloride still contained therein. Since the water contents of these liquors generally suffice for simultaneously dissolving also the alkaline earth metal chloride in the quantities required by the present process, it is advantageous to supply such alkaline earth metal chloride to the solution in solid form. The separation of the sodium chloride formed in the process together with that already present, in this case, in the starting solution is preferably effected in successive stages.

In the following a number of various modifications of the present invention as applied to the production of chlorates and perchlorates will be described in detail by way of example.

In order to produce chlorate of calcium, an aqueous solution of equivalent quantities of sodium chlorate and calcium chloride which is saturated at about 100° C. is prepared. While maintaining it in boiling condition, about 91 to 92 percent of the sodium chloride resulting from double decomposition precipitate from the hot solution (fraction I) and are separated by filtration while hot from the solution still containing the chlorate of calcium formed. From the latter a crystallized product containing about 85 percent of chlorate of calcium, about 8 to 9 percent of chlorate of sodium, and about 3 to 4 percent of sodium chloride may be obtained by cooling. In order to further reduce the sodium compound and the chloride contents of the product it is, however, preferable to add an excess of about 10 percent of sodium chlorate to the mother liquor saturated with sodium chloride remaining after removal of the precipitated sodium chloride. Thus the concentration of the sodium ions is increased in the solution and the solubility of the sodium chloride is consequently diminished with precipitation of further quantities of sodium chloride. The precipitate obtained (fraction II) consists of a mixture of sodium chloride and sodium chlorate. After removal of the latter the filtrate is preferably diluted to such an extent that the calcium chlorate contained therein will remain dissolved also in the cold, and then cooled to a lower temperature which results in precipitating most of the excess of sodium chloride (fraction III). Fractions II and III are preferably added to the next batch, taking account, of course, of the sodium chlorate contained therein and also of its (comparatively low) calcium chloride content. The mother liquor resulting after separation of fraction III is then evaporated until on cooling about 60 percent of its calcium chlorate content are precipitated. The approximate composition of the precipitate thus obtained is as follows:

| | Percent |
|---|---|
| $Ca(ClO_3)_2.2H_2O$ | 97.5 |
| $CaCl_2$ | 1.3 |
| NaCl | 1.0 |

The remaining mother liquor which still contains calcium chlorate and is concentrated with respect to sodium chloride may be worked up by adding more sodium chlorate so as to precipitate further quantities of sodium chloride. This is advantageously carried out by adding the mother liquor to the mother liquor of the next batch resulting from the separation of the first sodium chloride precipitate.

*Example I*

870 kgs. of sodium chlorate are dissolved in 428 ltrs. of water while boiling. The boiling solution is slowly caused to run into a boiling solution of 450 kgs. of calcium chloride in 260 ltrs. of water. Boiling is continued while stirring, until 428 ltrs. of water are evaporated. During evaporation sodium chloride precipitates in a coarsely crystalline form and is separated from the solution by centrifuging while hot. In this manner 382 kgs. of sodium chloride are obtained (fraction I) which contain only very little calcium chlorate (less than about 1 percent).

The remaining lye is stirred for some time while boiling with 100 kgs. sodium chlorate and then again subjected to centrifuging in the heat. The salt separated in this operation (118.5 kgs., fraction II) has the composition:

| | Percent |
|---|---|
| $Ca(ClO_3)_2$ | 18.8 |
| $NaClO_3$ | 62.3 |
| NaCl | 18.4 |

The lye is then diluted with water until its specific gravity amounts to 1.640 (at 100° C.), and allowed to cool. The precipitate obtained as the result of this step (123.6 kgs., fraction III) has the following composition:

| | Percent |
|---|---|
| $Ca(ClO_3)_2$ | 19.1 |
| $NaClO_3$ | 78.5 |
| $CaCl_2$ | 2.4 |

Fractions II and III are added to the next batch taking into account their chlorate of sodium and chloride of calcium contents.

The lye remaining from fraction III is, if necessary, after evaporation until its specific gravity amounts to 1.82 at 100° C., cooled down to 20° C. and seeded with crystals of calcium chlorate. The final product thus precipitated (517.1 kgs.) is separated by centrifuging, and has the following composition:

| | Percent |
|---|---|
| $Ca(ClO_3)_2.2H_2O$ | 97.5 |
| $CaCl_2$ | 1.5 |
| NaCl | 1.0 |

The mother liquor (300 ltrs.=521 kgs., specific gravity 1.74) having the following composition:

| | Percent |
|---|---|
| $Ca(ClO_3)_2$ | 56.8 |
| $CaCl_2$ | 5.0 |
| NaCl | 4.8 |
| $H_2O$ | 33.4 | is worked up by evaporating 60 ltrs. of water and adding 100 kgs. of sodium chlorate, thus obtaining a lye having approximately the same composition as the filtrate of fraction I and which therefore can be combined with the latter in the next batch.

For the production of perchlorate of magnesium a starting solution which is saturated with equivalent quantities of sodium perchlorate and magnesium chloride at 120° C. is preferably employed. From this hot solution, about 95 percent of the sodium chloride formed by double decomposition are precipitated (fraction I) and are separated by filtration in the heat from the solution containing magnesium perchlorate. From this solution a technically pure hexa-hydrate of perchlorate of magnesium $$(Mg(ClO_4)_2.6H_2O)$$

containing less than about 1 percent of sodium chloride can be caused to crystallize on cooling, by taking into account the fact that the concentration of the sodium chloride in the mother liquor must not exceed saturation since otherwise also sodium chloride would be caused to crystallize simultaneously. It is therefore necessary to add a certain quantity of water to the solution in order to ensure the presence of sufficient water not only for the formation of the hexa-hydrate but also for maintaining in solution the sodium chloride present. The mother liquor filtered off from the precipitated crystals of hexa-hydrate is further concentrated by evaporation, this causing precipitation of a mixture of sodium chloride and sodium perchlorate (fraction II). After removing the latter by filtration and adding water as above, further quantities of hexa-hydrate of perchlorate of magnesium can be caused to crystallize on cooling. Repeated treatment of the mother liquor in the manner described results in the recovery, as technically pure perchlorate of magnesium, of practically all the sodium perchlorate introduced into the process.

*Example II*

702 kgs. of $NaClO_4.H_2O$ are dissolved in 400 ltrs. of water and heated. Into this solution 508 kgs. of $MgCl_2.6H_2O$, dissolved in 200 ltrs. of water, are introduced while hot and with continuous stirring. By applying a vacuum of 80 mms. mercury column, 570 ltrs. of water are evaporated. Normal pressure is re-established and the temperature of the solution is raised to 120° C. In this manner 320 kgs. of sodium chloride are precipitated (fraction I), containing a small percentage of magnesium salt as impurity, and separated from the mother liquor by centrifuging. 110 ltrs. of water are added to the filtrate which is then slowly cooled down to 15° C., this resulting in the crystallization of 180 kgs. of $$Mg(ClO_4)_2.6H_2O$$

containing less than 1 percent of NaCl.

The hexa-hydrate thus formed is removed and the mother liquor subjected to further concentration. After evaporating 75 ltrs. of water in vacuo as above, and increasing the temperature to 120° C., 15 kgs. of sodium chloride are precipitated (fraction II) and separated by centrifuging. The remaining mother liquor is combined with 60 ltrs. of water and, on cooling, yields further 208 kgs. of $Mg(ClO_4)_2.6H_2O$ in crystallized form, containing less than 1 percent of NaCl.

A repeated treatment of the mother liquor in the same manner yields further 100 kgs. of $$Mg(ClO_4)_2.6H_2O$$

with less than 1 percent of NaCl.

The final mother liquor is then worked up in the next batch.

In the manner described, practically all the $Mg(ClO_4)_2 6H_2O$ is obtained in a technically pure state. By a single treatment of the crystals with a concentrated solution of magnesium perchlorate, the NaCl content of the crystals is reduced to 0.05 percent.

The process according to the present invention also serves for directly obtaining mixtures of chlorates in which sodium chlorate is present. These mixtures are of particular interest with respect to the proposal, recently made, to employ mixtures of the totally or partially dehydrated hydrates of the chlorates of the alkaline earth metals (including magnesium) and particularly chlorate of calcium, with chlorate of sodium, as herbicides. In order to obtain such mixtures a process somewhat similar to that described with reference to the production of calcium chlorate is followed. Instead of employing equivalent quantities of calcium chloride and sodium chlorate in the starting solution, an excess of sodium chlorate is employed. On evaporating the boiling solution, first sodium chloride is precipitated, leaving behind a lye which, according to the proportion of chloride of calcium used, contains, besides chlorate of calcium, a larger or smaller percentage of chlorate of sodium. After removal of the precipitated sodium chloride and further evaporation of the lye, the mixed salt separates and can, after separation of the mother liquor and, if necessary, subsequent dehydration, be immediately employed as a herbicide.

*Example III*

470 kgs. of sodium chlorate are dissolved in 231 ltrs. of boiling water. The hot solution is slowly run into a boiling solution of 190 kgs. of chloride of calcium in 110 ltrs. of water while stirring. After evaporating 219 ltrs. of water 131 kgs. of a coarsely crystalline precipitate are formed which are separated from the mother liquor by centrifuging while hot, and flushing with little water. The precipitate contains:

| | Kgs. |
|---|---|
| NaCl | 117.7 |
| NaClO$_3$ | 11.3 |
| Ca(ClO$_3$)$_2$+2H$_2$O | 2.0 |

The centrifuged mother liquor is seeded with crystals of calcium chlorate while cooling, this causing separation of about 300 kgs. of a mixed salt consisting of:

| | Percent |
|---|---|
| NaCl | 3 |
| NaClO$_3$ | 49 |
| Ca(ClO$_3$)$_2$+2H$_2$O | 48 |

The mother liquor still containing

| | Kgs. |
|---|---|
| NaCl | 7.2 |
| CaCl$_2$ | 24.7 |
| Ca(ClO$_3$)$_2$ | 105.0 | is along, with the flushing water of the first centrifuging operation, added to the next batch for further working up, the sodium chlorate and calcium chloride contained in the liquors being duly taken into account.

I claim:—

1. A process of producing chlorine oxygen compounds of the alkaline earth metals, which comprises forming an aqueous solution containing an alkaline earth metal chloride and the sodium compound of the group consisting of sodium chlorate and sodium perchlorate, subjecting the solution to partial evaporation by boiling so as to separate sodium chloride, removing the separated sodium chloride from the boiling solution, cooling the solution so as to cause the alkaline earth metal compound of the chlorine-oxygen acid to crystallize from the solution, and finally recovering such crystallized product from the solution.

2. A process of producing chlorine oxygen compounds of the alkaline earth metals, which comprises forming an aqueous solution containing an alkaline earth metal chloride and the sodium compound of the group consisting of sodium chlorate and sodium perchlorate in stoechiometrically equivalent proportions, subjecting the solution to partial evaporation by boiling so as to separate sodium chloride, removing the separated sodium chloride from the boiling solution, cooling the solution so as to cause the alkaline earth metal compound of the chlorine-oxygen acid to crystallize from the solution, and finally recovering such crystallized product from the solution.

3. A process of producing chlorine-oxygen compounds of the alkaline earth metals, which comprises forming an aqueous solution of an alkaline earth metal chloride and the sodium compound of the group consisting of sodium chlorate and sodium perchlorate, subjecting the solution to partial evaporation by boiling so as to separate sodium chloride, removing the separated sodium chloride from the boiling solution, cooling the solution so as to cause the alkaline earth metal compound of the chlorine-oxygen acid to crystallize from the solution, removing such crystallized product from the solution, causing further quantities of sodium compounds to precipitate from the solution, removing such precipitate from the solution, and recovering more alkaline earth metal compounds of the chlorine-oxygen acid from the solution.

4. A process of producing chlorine-oxygen compounds of the alkaline earth metals, which comprises forming an aqueous solution of an alkaline earth metal chloride and the sodium compound of the group consisting of sodium chlorate and sodium perchlorate, subjecting the solution to partial evaporation by boiling so as to separate sodium chloride, removing the separated sodium chloride from the boiling solution, cooling the solution so as to cause the alkaline earth metal compound of the chlorine-oxygen acid to crystallize from the solution, removing such crystallized product from the solution, adding further quantities of the sodium compound of the chlorine-oxygen acid to the solution so as to cause precipitation of further amounts of sodium compound, removing such precipitate from the solution, and recovering more alkaline earth metal compounds of the chlorine-oxygen acid from the solution.

5. A process of producing chlorine-oxygen compounds of the alkaline earth metals, which comprises forming an aqueous solution containing an alkaline earth metal chloride and the sodium compound of the group consisting of sodium chlorate and sodium perchlorate, subjecting the solution to partial evaporation by boiling so as to separate sodium chloride, removing the separated sodium chloride from the boiling solution, cooling the solution so as to cause the alkaline earth metal compound of the chlorine-oxygen acid to crystallize from the solution, further concentrating the remaining solution by evaporation so as to precipitate more sodium compounds from the solution, removing such precipitate from the solution and recovering more alkaline earth metal compounds of the chlorine-oxygen acid from the solution.

6. A process of producing calcium chlorate, which comprises forming an aqueous solution of calcium chloride and of sodium chlorate in stoechiometrically equivalent proportions, subjecting the solution to partial evaporation by boiling so as to separate sodium chloride, removing the separated sodium chloride from the boiling solution, cooling the solution so as to cause calcium chlorate to crystallize from the solution, removing such crystallized product from the solution, causing further quantities of sodium compounds to precipitate from the solution, removing such precipitate from the solution, and recovering more calcium chlorate from the solution.

7. A process of producing magnesium perchlorate, which comprises forming an aqueous solution in magnesium chloride and of sodium perchlorate in stoechiometrically equivalent proportions, subjecting the solution to partial evaporation by boiling so as to separate sodium chloride, removing the separated sodium chloride from the boiling solution, cooling the solution so as to cause magnesium perchlorate to crystallize from the solution, removing such crystallized product from the solution, causing further quantities of sodium compounds to precipitate from the solution, removing such precipitate from the solution, and recovering more magnesium perchlorate from the solution.

8. A process of producing chlorine-oxygen compounds of the alkaline earth metals, which comprises forming an aqueous solution containing an alkaline earth metal chloride and the sodium compound of a halogen-oxygen acid, subjecting the solution to partial evaporation by boiling so as to separate sodium chloride, removing the separated sodium chloride from the boiling solution, cooling the solution so as to cause the alkaline earth metal compound of the chlorine-oxygen acid to crystallize from the solution, removing such crystallized product from the solution, causing further quantities of sodium compounds to precipitate from the solution, removing such precipitated compounds from the solution, adding them to the filtrate of the first sodium chloride precipitates of another batch, and recovering more alkaline earth metal compounds from the remaining solution.

9. A process of producing calcium chlorate, which comprises forming an aqueous solution of calcium chloride and of sodium chlorate in stoechiometrically equivalent proportions, subjecting the solution to partial evaporation by boiling so as to separate sodium chloride, removing the separated sodium chloride from the boiling solution, cooling the solution so as to cause calcium chlorate to crystallize from the solution, removing such crystallized product from the solution, causing further quantities of sodium compounds to precipitate from the solution, removing such precipitated compounds from the solution, adding them to the filtrate of the first sodium chloride precipitate of another batch, and recovering more calcium chlorate from the remaining solution.

10. A process of producing magnesium perchlorate, which comprises forming an aqueous solution of magnesium chloride and of sodium perchlorate in stoechiometrically equivalent proportions, subjecting the solution to partial evaporation by boiling so as to separate sodium chloride, removing the separated sodium chloride from the boiling solution, cooling the solution so as to cause magnesium perchlorate to crystallize from the solution, removing such crystallized product from the solution, causing further quantities of sodium compounds to precipitate from the solution, removing such precipitated compounds from the solution, adding them to the filtrate of the first sodium chloride precipitate of another batch, and recovering more magnesium perchlorate from the remaining solution.

11. A process of producing magnesium perchlorate hexa-hydrate, which comprises forming an aqueous solution of magnesium chloride and of sodium perchlorate in stoechiometrically equivalent proportions subjecting the solution to partial evaporation by boiling so as to separate sodium chloride, removing the separated sodium chloride from the boiling solution, adding sufficient water to the solution so as to hold all the remaining sodium chloride in solution while magnesium perchlorate hexa-hydrate is precipitated, cooling the solution so as to cause magnesium perchlorate hexa-hydrate to crystallize from the solution, removing such crystallized product from the solution, causing further quantities of sodium compounds to precipitate from the solution, removing such precipitated compounds from the solution, adding them to the filtrate of the first sodium chloride precipitate of another batch, and recovering more magnesium perchlorate hexa-hydrate from the remaining solution.

12. A process of producing a mixture of calcium chlorate and sodium chlorate, which comprises forming an aqueous solution of sodium chlorate and of a quantity of magnesium chloride which is insufficient to combine with all the sodium chloride present, subjecting the solution to partial evaporation by boiling so as to separate sodium chloride, removing the separated sodium chloride from the boiling solution, cooling the solution so as to cause a mixture of calcium chlorate and sodium chlorate to crystallize from the solution, removing such crystallized product from the solution, and preparing further quantities of the said aqueous solution from the remaining solution so as to recover further quantities of a mixture of calcium chlorate and sodium chlorate in another batch.

13. A process of producing alkaline earth metal chlorates which comprises dissolving an alkaline earth metal chloride in the liquor obtained in the electrolysis of an aqueous solution of sodium chloride, said liquor containing a major quantity of sodium chlorate and a minor quantity of sodium chloride, subjecting the solution thus obtained to partial evaporation by boiling so as to separate sodium chloride, removing the separated sodium chloride from the boiling solution, cooling the solution so as to cause a product containing the alkaline earth metal chlorate to crystallize from the solution, and finally recovering such crystallized product from the solution.

UDO EHRHARDT.